United States Patent
Kondou et al.

(10) Patent No.: US 11,614,264 B2
(45) Date of Patent: Mar. 28, 2023

(54) ICEMAKING SYSTEM AND A METHOD OF CONTROLLING EVAPORATION TEMPERATURE REFERRED TO BY THE ICEMAKING SYSTEM

(71) Applicant: DAIKIN INDUSTRIES, LTD., Osaka (JP)

(72) Inventors: Azuma Kondou, Osaka (JP); Takeo Ueno, Osaka (JP); Shouhei Yasuda, Osaka (JP); Takahito Nakayama, Osaka (JP); Satoru Sakae, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 131 days.

(21) Appl. No.: 16/959,621

(22) PCT Filed: Jan. 11, 2019

(86) PCT No.: PCT/JP2019/000770
§ 371 (c)(1),
(2) Date: Jul. 1, 2020

(87) PCT Pub. No.: WO2019/139146
PCT Pub. Date: Jul. 18, 2019

(65) Prior Publication Data
US 2020/0386462 A1    Dec. 10, 2020

(30) Foreign Application Priority Data

Jan. 15, 2018 (JP) .............................. JP2018-003929

(51) Int. Cl.
*F25C 1/147* (2018.01)
(52) U.S. Cl.
CPC .......... *F25C 1/147* (2013.01); *F25C 2600/04* (2013.01)

(58) Field of Classification Search
CPC .................. F25C 1/147; F25C 2600/04; F25C 2301/002; F25C 2500/08; F25C 1/00;
(Continued)

(56) References Cited

U.S. PATENT DOCUMENTS 2,961,842 A * 11/1960 Wright ................ G01F 23/0007
340/617
3,803,860 A * 4/1974 Nagashima ............... C02F 1/22
62/534
(Continued)

FOREIGN PATENT DOCUMENTS

CN        107024048 A       8/2017
JP        01210774 A    *  8/1989
(Continued)

OTHER PUBLICATIONS

International Search Report issued in corresponding International Application No. PCT/JP2019/000770, dated Mar. 19, 2019, with translation (5 pages).
(Continued)

*Primary Examiner* — Eric S Ruppert
*Assistant Examiner* — Kirstin U Oswald
(74) *Attorney, Agent, or Firm* — Osha Bergman Watanabe & Burton LLP

(57) ABSTRACT

An icemaking system includes: a refrigerant circuit that executes a vapor compression refrigeration cycle; a circulation circuit that circulates solution as a cooling target of the refrigerant circuit; and a control device that controls refrigerant evaporation temperature at the refrigerant circuit. The circulation circuit includes a solution flow path of: an ice generator; a solution tank that stores the solution; and a pump that pressure feeds the solution to the solution flow path. The refrigerant circuit includes: an evaporator of the ice generator; a compressor; a condenser; and an expansion
(Continued)

valve. The control device includes a central processing unit (CPU) that adjusts to lower evaporation temperature at the evaporator as the solution has higher solute concentration.

7 Claims, 9 Drawing Sheets

(58) Field of Classification Search
CPC ...... F25C 1/145; F25B 13/00; F25B 2500/19; F25B 2600/0253; F25B 2700/06; F25B 2700/1933; F25B 49/022; F25B 5/02; Y02B 30/70
USPC .......................................................... 62/66
See application file for complete search history.

(56) References Cited

U.S. PATENT DOCUMENTS

| | | | | |
|---|---|---|---|---|
| 3,869,870 | A * | 3/1975 | Kuehner | F25D 17/02 165/104.31 |
| 4,373,345 | A * | 2/1983 | Tyree, Jr. | F25B 29/003 62/345 |
| 4,551,159 | A * | 11/1985 | Goldstein | F25C 1/00 62/541 |
| 4,893,480 | A * | 1/1990 | Matsui | G05D 23/20 700/12 |
| 4,936,102 | A * | 6/1990 | Goldstein | A23B 4/066 62/76 |
| 6,305,189 | B1 * | 10/2001 | Menin | A23L 3/405 62/544 |
| 6,637,214 | B1 * | 10/2003 | Leitzke | A23G 9/163 62/342 |
| 2001/0047662 | A1 * | 12/2001 | Takao | F25D 16/00 62/430 |
| 2003/0010054 | A1 * | 1/2003 | Esch | F25D 31/007 62/250 |
| 2004/0093888 | A1 * | 5/2004 | Willamor | F25C 5/187 62/344 |
| 2008/0216490 | A1 * | 9/2008 | Wakatsuki | F25C 1/12 62/74 |
| 2008/0276629 | A1 * | 11/2008 | Yamamoto | F25C 1/145 62/458 |
| 2009/0266106 | A1 * | 10/2009 | Ogoshi | F28F 1/24 62/434 |
| 2011/0179812 | A1 * | 7/2011 | Goldstein | F25D 3/02 62/62 |
| 2012/0000217 | A1 * | 1/2012 | Gudnason | C09K 5/066 62/126 |

FOREIGN PATENT DOCUMENTS

| | | | |
|---|---|---|---|
| JP | 06-307684 A | * | 11/1994 |
| JP | H06307684 A | | 11/1994 |
| JP | H09021580 A | | 1/1997 |
| JP | 10019428 A | * | 1/1998 |
| JP | H10019428 A | | 1/1998 |
| JP | 2005300044 A | * | 10/2005 |
| JP | 2009281651 A | | 12/2009 |
| JP | 2016033444 A | * | 3/2016 |

OTHER PUBLICATIONS

Extended European Search Report issued in the counterpart European Patent Application No. 19738285.6, dated Feb. 8, 2021 (9 pages).

International Preliminary Report on Patentability issued in corresponding International Application No. PCT/JP2019/000770, dated Jul. 21, 2020 (10 pages).

* cited by examiner

ICEMAKING SYSTEM AND A METHOD OF CONTROLLING EVAPORATION TEMPERATURE REFERRED TO BY THE ICEMAKING SYSTEM

TECHNICAL FIELD

The present invention relates to an icemaking system for manufacture of ice slurry, and a method of controlling evaporation temperature referred to by the icemaking system.

BACKGROUND

An icemaking system configured to generate ice slurry includes an icemaker having an interior frozen due to excessive increase in icemaking amount to cause damage to devices if refrigerant evaporation temperature is lowered immoderately during icemaking operation. It is thus important not to immoderately lower the refrigerant evaporation temperature during icemaking operation.

Patent Literature 1 describes an evaporation pressure control device for an icemaker, configured to enable continuous icemaking for a long period of time without defrost operation through prevention of ice lock of the icemaker.

The evaporation pressure control device according to Patent Literature 1 is configured to calculate refrigerant evaporation temperature (TF−ΔT) of the icemaker from solution crystallization temperature TF and a temperature difference set value ΔT, set a saturation pressure equivalent of the refrigerant evaporation temperature (TF−ΔT) to a target value of an evaporation pressure control valve provided on a refrigerant outlet pipe to prevent ice lock of a heat transfer tube (a flow path for solution) provided in the icemaker.

PATENT LITERATURE

Patent Literature 1: Japanese Unexamined Patent Publication No. 10-19428

The evaporation pressure control device according to Patent Literature 1 has the temperature difference set value ΔT subtracted from the solution crystallization temperature TF and being constant regardless of solution concentration. Accordingly, ice lock is likely to occur within a range less than predetermined solution concentration and icemaking capacity cannot be improved within a range equal to and more than the predetermined solution concentration, which may fail to achieve appropriate icemaking operation according to solution concentration change.

SUMMARY

One or more embodiments of the present invention inhibit ice lock and secure desired icemaking capacity in an icemaking system having solution as a cooling target.

(1) An icemaking system according to one or more embodiments of the present invention includes a refrigerant circuit configured to execute a vapor compression refrigeration cycle, a circulation circuit for solution as a cooling target of the refrigerant circuit, and a control device configured to control refrigerant evaporation temperature at the refrigerant circuit.

The circulation circuit includes a solution flow path of an ice generator, a solution tank used to store the solution, and a pump configured to pressure feed the solution to the solution flow path. The refrigerant circuit includes an evaporator of the ice generator, a compressor, a condenser, and an expansion valve.

The control device includes a control unit configured to adjust to lower evaporation temperature at the evaporator as the solution has higher solute concentration.

The control unit in the icemaking system according to one or more embodiments of the present invention adjusts to lower the evaporation temperature at the evaporator as the solute concentration of the solution is higher (i.e., the control unit causes evaporation temperature at the evaporator to decrease as solute concentration of the solution increases). This configuration achieves both inhibition of ice lock and securement of desired icemaking capacity even if the solute concentration changes during icemaking operation.

(2) In the icemaking system according to one or more embodiments of the present invention, the control unit calculates target evaporation temperature in accordance with correlation between the solute concentration and the refrigerant evaporation temperature, the correlation being defined such that a temperature difference between freezing temperature of the solution and the refrigerant evaporation temperature increases as the solute concentration increases, and adjusts the evaporation temperature at the evaporator to reach the target evaporation temperature thus calculated.

(3) When the ice generator is configured by a double pipe icemaker including an inner pipe and an outer pipe in the icemaking system according to one or more embodiments of the present invention, the correlation may include first correlation of a case where the inner pipe has adjusted inner surface roughness, and second correlation of a case where the inner pipe has unadjusted inner surface roughness.

(4) In this case, the control unit may adjust the evaporation temperature at the evaporator in accordance with the first correlation when the ice generator included in the system has adjusted inner surface roughness, and may adjust the evaporation temperature at the evaporator in accordance with the second correlation when the ice generator included in the system has unadjusted inner surface roughness.

This configuration allows the target evaporation temperature to be set accurately in accordance with a type of the ice generator included in the icemaking system, and thus achieves more appropriate adjustment of the evaporation temperature at the evaporator in comparison to a case where the correlation is unchanged regardless of whether or not the inner surface roughness is adjusted.

(5) In the icemaking system according to one or more embodiments of the present invention, the control unit may output alarm information for warning a user that the solute concentration has a measurement value less than a first threshold.

This configuration enables notification to the user that icemaking capacity deteriorates due to low solute concentration. The user can thus be demanded to execute predetermined work such as supply of solute to the solution tank of the icemaking system.

(6) In the icemaking system according to one or more embodiments of the present invention, the control unit may execute a reliability priority mode of prioritizing freezing prevention rather than icemaking capacity when the measurement value of the solute concentration is less than a second threshold, and execute a capacity priority mode of prioritizing icemaking capacity rather than freezing prevention when the measurement value of the solute concentration is equal to or more than the second threshold.

This configuration enables appropriate icemaking operation according to a level of the solute concentration.

(7) In the icemaking system according to one or more embodiments of the present invention, the evaporation temperature at the evaporator can be adjusted in accordance with first adjustment to sixth adjustment defined as follows:

first adjustment including adjusting a frequency of the compressor of an inverter type; second adjustment including adjusting at least one of a full load or unload period and an unload percentage of the compressor of an unload type; third adjustment including adjusting an opening degree of the expansion valve; fourth adjustment including adjusting rotational speed of a fan; fifth adjustment including adjusting output of a heating member configured to heat a flow-in pipe of the evaporator; and sixth adjustment including adjusting a flow rate of the solution.

(8) A control method according to one or more embodiments of the present invention relates to a method of controlling evaporation temperature at an evaporator of an ice generator, the evaporator included in a refrigerant circuit configured to execute a vapor compression refrigeration cycle having solution as a cooling target, the method including: calculating target evaporation temperature in accordance with correlation between solute temperature and a refrigerant evaporation temperature, the correlation defined such that an icemaking amount increases as the solution has higher solute concentration; and adjusting the evaporation temperature at the evaporator to reach the target evaporation temperature thus calculated.

The control method according to one or more embodiments of the present invention includes calculating the target evaporation temperature in accordance with the correlation between the solute temperature and the refrigerant evaporation temperature defined such that the icemaking amount increases as the solute concentration of the solution is higher.

The solute concentration of the solution thus naturally increases upon simply extending duration of icemaking operation and increasing the icemaking amount, for improvement in icemaking capacity. The icemaking capacity can be improved also by additionally supplying the solute to the circulation circuit for the solution to increase the solute concentration.

The present invention achieves inhibition of ice lock and securement of desired icemaking capacity.

DETAILED DESCRIPTION

One or more embodiments of the present invention will be described hereinafter with reference to the drawings.

[Entire Configuration of Icemaking System]

Figure 1:
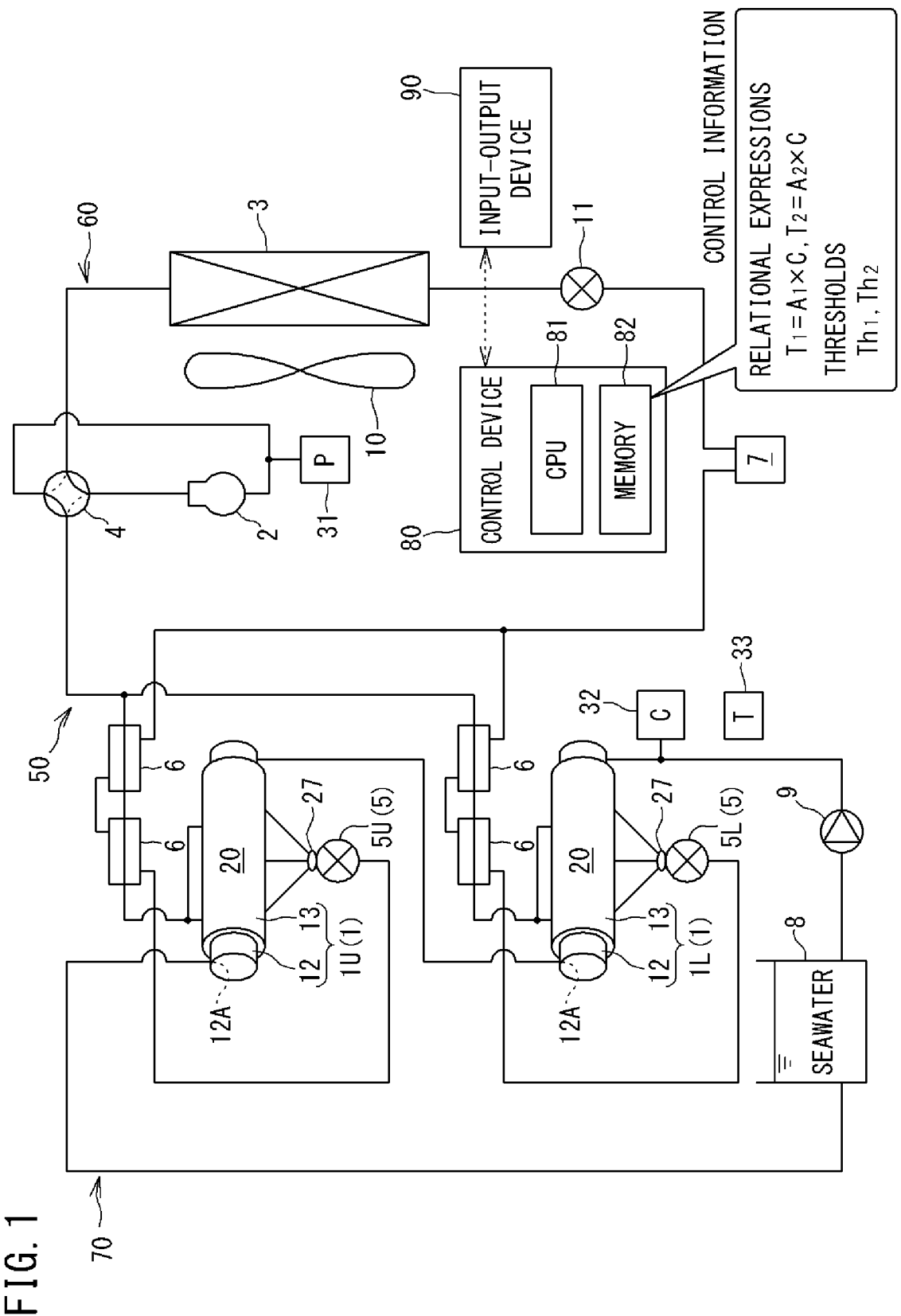
FIG. 1 is a schematic configuration diagram of an icemaking system according to one or more embodiments of the present invention.

FIG. 1 is a schematic configuration diagram of an icemaking system 50 according to one or more embodiments of the present invention.

The icemaking system 50 according to one or more embodiments includes icemakers 1U and 1L configured to continuously generate ice slurry from seawater as a raw material stored in a seawater tank 8, and stores the generated ice slurry in the seawater tank 8.

The icemakers (hereinafter, also called "ice generators") 1U and 1L according to one or more embodiments may be each configured as a double pipe icemaker.

In one or more embodiments, the plurality of (two depicted exemplarily) icemakers (ice generators) will be generally denoted by reference sign "1" and will be distinguishably denoted by reference signs "1U" and "1L". The same applies to "first expansion valves".

Ice slurry corresponds to sherbet ice containing water or aqueous solution and minute ice mixed in the water. Ice slurry may also be called icy slurry, slurry ice, slush ice, or liquid ice.

The icemaking system 50 according to one or more embodiments is configured to continuously generate ice slurry from seawater. The icemaking system 50 according to one or more embodiments is thus placed on a fishing boat, at a fishing port, or the like, and ice slurry returned to the seawater tank 8 is used to cool fresh fish or the like.

As depicted in FIG. 1, the icemaking system 50 includes a refrigerant circuit 60 configured to execute a vapor compression refrigeration cycle, and a circulation circuit 70 disposed between the seawater tank 8 and the ice generators 1U and 1L and configured to circulate seawater as a cooling target of the refrigerant circuit 60.

The icemaking system 50 further includes a control device (controller) 80 configured to control operation of devices included in the icemaking system 50, and an input-output device 90 communicably connected to the control device 80.

The refrigerant circuit 60 includes a heat exchange unit 20 (see FIG. 2) included in each of the ice generators 1, a compressor 2, a heat source heat exchanger 3, a four-way switching valve 4, first expansion valves 5, superheaters 6, a second expansion valve 11, a receiver 7, and the like. The refrigerant circuit 60 includes these devices connected via pipes to constitute a depicted route.

The heat exchange unit 20 in each of the ice generators 1 functions as a utilization heat exchanger of the refrigerant circuit 60. The compressor 2 is constituted by an inverter compressor having variable capacity through inverter control.

The first expansion valves 5 each function as a utilization expansion valve and is constituted by an electronic expansion valve having a controllable opening degree according to a control signal. The second expansion valve 11 functions as a heat source expansion valve and is constituted by an electronic expansion valve having a controllable opening degree according to a control signal.

The circulation circuit 70 includes a seawater flow path 12A (see FIG. 2) included in each of the ice generators 1, the seawater tank 8, a pump 9, and the like. The circulation circuit 70 includes these devices connected via pipes to constitute a depicted route.

The seawater flow path 12A in the ice generator 1 serves as a sherbet ice slurry generation section on the circulation circuit 70.

The pump 9 sucks seawater from the seawater tank 8 and pressure feeds the seawater to the seawater flow path 12A in the ice generator 1. Ice slurry generated in the seawater flow path 12A is returned to the seawater tank 8 along with seawater due to pump pressure.

The circulation circuit 70 according to one or more embodiments includes the plurality of ice generators 1U and 1L. The seawater flow paths 12A of the ice generators 1U and 1L are connected in series.

The seawater pressure fed from the pump 9 is supplied to the upper ice generator 1U after the lower ice generator 1L generates ice, and is returned to the seawater tank 8 after the upper ice generator 1U generates ice.

The superheaters 6 and the first expansion valves 5U and 5L of the refrigerant circuit 60 are provided respectively for the ice generators 1U and 1L. In the refrigerant circuit 60 depicted in FIG. 1, the first expansion valve 5U corresponds to the ice generator 1U and the first expansion valve 5L corresponds to the ice generator 1L.

The superheaters 6 are each constituted by a double pipe heat exchanger or the like, and a plurality of (two depicted exemplarily) superheaters 6 is provided for each of the ice generators 1U and 1L. Each of the superheaters 6 corresponding to the ice generators 1U and 1L includes an outer pipe and an inner pipe.

Discharge side pipes supplied with a refrigerant from the receiver 7 during icemaking operation include discharge side branching pipes branching into the number of the ice generators 1U and 1L.

The outer pipes of the superheaters 6 are connected in series to the corresponding discharge side branching pipe. The plurality of superheaters 6 aligned in series with respect to the corresponding discharge side branching pipe includes the superheater 6 that is disposed downstream in a refrigerant flow direction during icemaking operation and includes the outer pipe communicating with the first expansion valve 5U or 5L.

Return side pipes used to return the refrigerant to the compressor 2 during icemaking operation include return side branching pipes branching into the number of the ice generators 1U and 1L.

The inner pipes of the superheaters 6 are connected in series to the corresponding return side branching pipe. The plurality of superheaters 6 aligned in series with respect to the corresponding return side branching pipe includes the superheater 6 that is disposed upstream in the refrigerant flow direction during icemaking operation and includes the inner pipe communicating with refrigerant flow-out ports 19 (see FIG. 2) of the ice generator 1.

[Configuration of Ice Generator]

Figure 2:
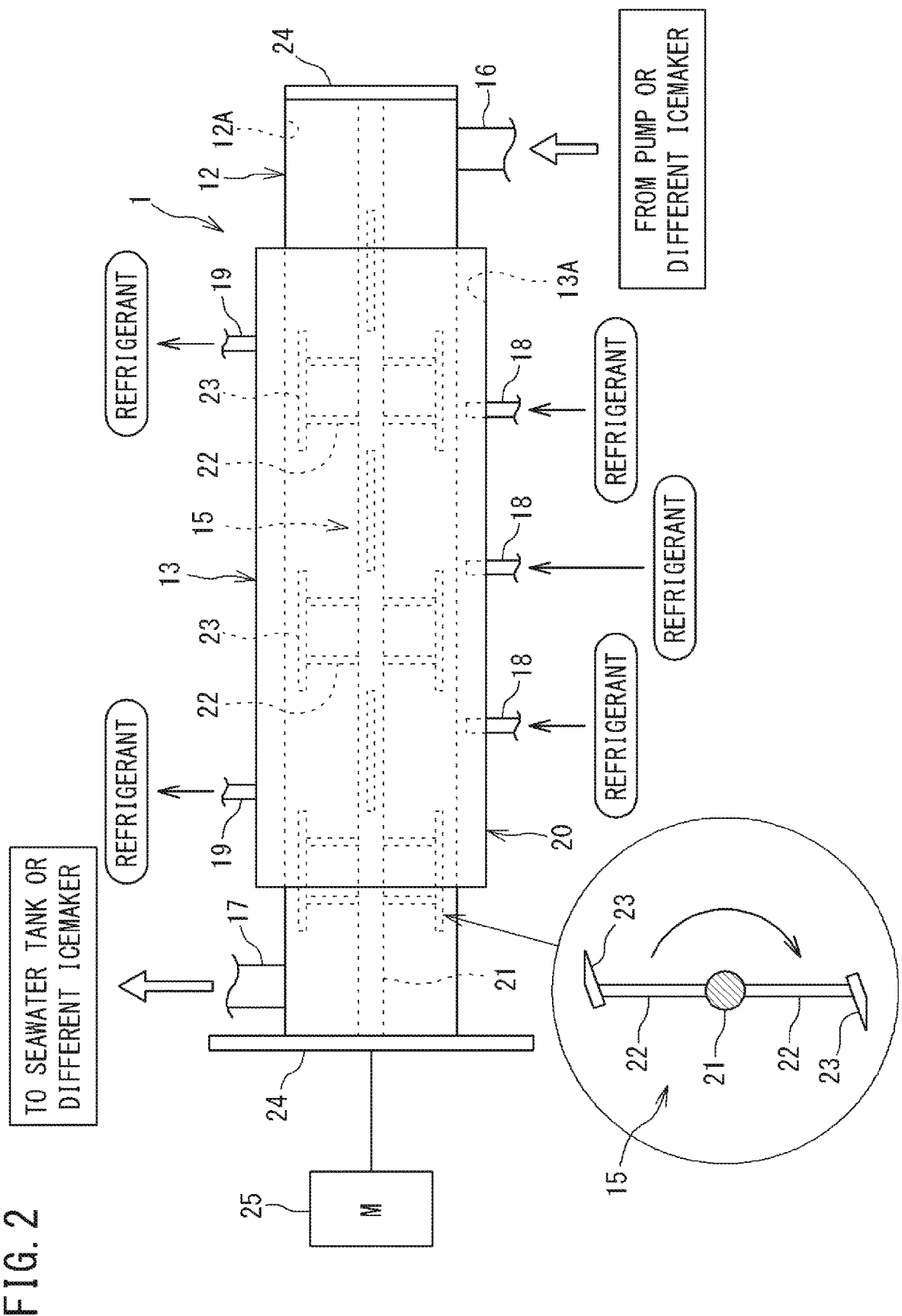
FIG. 2 is a side view depicting an exemplary configuration of an ice generator.

FIG. 2 is a side view depicting an exemplary configuration of the ice generator 1.

As depicted in FIG. 2, the ice generator 1 according to one or more embodiments is constituted by a horizontal double pipe icemaker including an inner pipe 12 and an outer pipe 13.

The inner pipe 12 is made of a metal tubular member having sealed axial (horizontal in FIG. 2) ends. The inner pipe 12 has an internal space constituting the seawater flow path 12A allowing seawater and ice slurry to pass therethrough. The seawater flow path 12A in the inner pipe 12 is provided with a blade mechanism 15.

The blade mechanism 15 inwardly scrapes ice particles generated on an inner circumferential surface of the inner pipe 12 and disperses the scraped ice particles in the inner pipe 12. The inner pipe 12 has a first axial end (a right end in FIG. 2) provided with a flow-in port 16 for seawater. The inner pipe 12 has a second axial end (a left end in FIG. 2) provided with a flow-out port 17 for seawater.

The outer pipe 13 is made of a metal tubular member larger in diameter and shorter in length than the inner pipe 12. The outer pipe 13 is disposed coaxially with the inner pipe 12 and covers an outer circumferential surface of the inner pipe 12. The outer pipe 13 has axial ends each sealed by a sealing wall in a doughnut shape (not depicted) to the outer circumferential surface of the inner pipe 12.

The outer circumferential surface of the inner pipe 12 and an inner circumferential surface of the outer pipe 13 define an annular space having a doughnut lateral sectional shape and constituting a refrigerant flow path 13A for the refrigerant. The heat exchange unit 20 in the ice generator 1 is constituted by circumferential wall portions of the inner pipe 12 and the outer pipe 13 forming the refrigerant flow path 13A.

The outer pipe 13 has a lower portion provided with a plurality of (three depicted exemplarily) flow-in ports 18 for the refrigerant. The outer pipe 13 has an upper portion provided with a plurality of (two depicted exemplarily) flow-out ports 19 for the refrigerant.

As depicted in FIG. 2, the blade mechanism 15 configured to scrape ice particles includes a shaft 21, support bars 22, and blades 23.

The shaft 21 is disposed coaxially with the inner pipe 12 and is accommodated in the seawater flow path 12A. The shaft 21 has axial ends rotatably attached to centers of sealing walls 24 sealing the axial ends of the inner pipe 12.

The shaft 21 has a first axial end (a left end in FIG. 2) connected to a motor 25. The motor 25 functions as a drive unit configured to rotate the blade mechanism 15 in a predetermined direction.

The support bars 22 are each made of a rod member projecting radially outward from an outer circumferential surface of the shaft 21. The support bars 22 are disposed at predetermined axial intervals along the shaft 21. The blades 23 are each fixed to a distal end of a corresponding one of the support bars 22. The blades 23 are each made of a resin band plate member or the like. The blades 23 each have an end edge positioned ahead in a rotation direction and tapered sharp.

The ice generator 1 includes a scraper assembly (hereinafter abbreviated as "assembly") having a pair of blades 23, 23.

The pair of blades 23, 23 constituting the single assembly has identical axial positions and positions in the rotation direction shifted by 180 degrees. There are provided a plurality of assemblies (six depicted exemplarily) axially along the shaft 21.

[Operating Modes of Icemaking System]

During icemaking operation of the icemaking system 50 according to one or more embodiments, the four-way switching valve 4 is kept in a state indicated by solid lines in FIG. 1. In this case, the compressor 2 discharges a gas refrigerant having high temperature and high pressure and flowing into the heat source heat exchanger 3 functioning as a condenser during icemaking operation.

The gas refrigerant flowed into the heat source heat exchanger 3 exchanges heat with air sent from a fan 10 to be condensed and liquefied. The refrigerant liquefied in the heat source heat exchanger 3 flows into the first expansion valves 5U and 5L via the second expansion valve 11 (fully opened during icemaking operation), the receiver 7, and the outer pipes of the superheaters 6.

The liquefied refrigerant is decompressed to have predetermined low pressure by the first expansion valves 5U and 5L and flows into the heat exchange units 20 in the ice generators 1U and 1L each functioning as an evaporator during icemaking operation, via the flow-in ports 18 (see FIG. 2) of the ice generators 1.

The refrigerant flowed into the heat exchange unit 20 of each of the ice generators 1 exchanges heat with seawater pressure fed to the seawater flow path 12A of the inner pipe 12 by the pump 9. When the seawater is cooled by the refrigerant thus evaporated, there are generated ice particles on and adjacent to an inner surface of the inner pipe 12.

The ice particles thus generated are scraped by the blade mechanism 15 and are mixed with seawater to form ice slurry in the seawater flow path 12A. The ice slurry flows out of the flow-out port 17 of the inner pipe 12 and returns to the seawater tank 8. A refrigerant evaporated and gasified in the heat exchange units 20 of the ice generators 1U and 1L returns to the compressor 2 via the inner pipes of the superheaters 6 and the four-way switching valve 4.

As described above, the circulation circuit 70 includes the two ice generators 1U and 1L having the inner pipes 12 connected in series. The circulation circuit 70 executes processing in the following order.

1) supply the lower ice generator 1L with the raw material from the pump 9
2) generate ice slurry in the lower ice generator 1L
3) transfer the ice slurry and seawater from the lower ice generator 1L to the upper ice generator 1U
4) generate ice slurry in the upper ice generator 1U
5) transfer the ice slurry and seawater from the upper ice generator 1U to the seawater tank 8

[Configuration of Control Device]

As depicted in FIG. 1, the control device 80 includes a control unit 81 including a central processing unit (CPU), and a storage unit 82 including a volatile memory. The storage unit 82 further includes a storage such as an HDD or an SSD configured to store a computer program.

The control unit 81 executes the computer program read out of the storage unit 82 to enable various control relevant to operation of the icemaking system 50.

The control unit 81 in the control device 80 is configured to switch the four-way switching valve 4, control the opening degrees of the first and second expansion valves 5 and 11, control capacity of the compressor 2, and the like, in accordance with measurement values of a pressure sensor, a temperature sensor, a current sensor, and the like disposed appropriately on the refrigerant circuit 60.

The control unit 81 in the control device 80 is configured to execute the following control to be executed during icemaking operation. The following description assumes icemaking operation, and the "heat exchange unit 20" in the ice generator 1 will be called an "evaporator 20".

Figure 4:
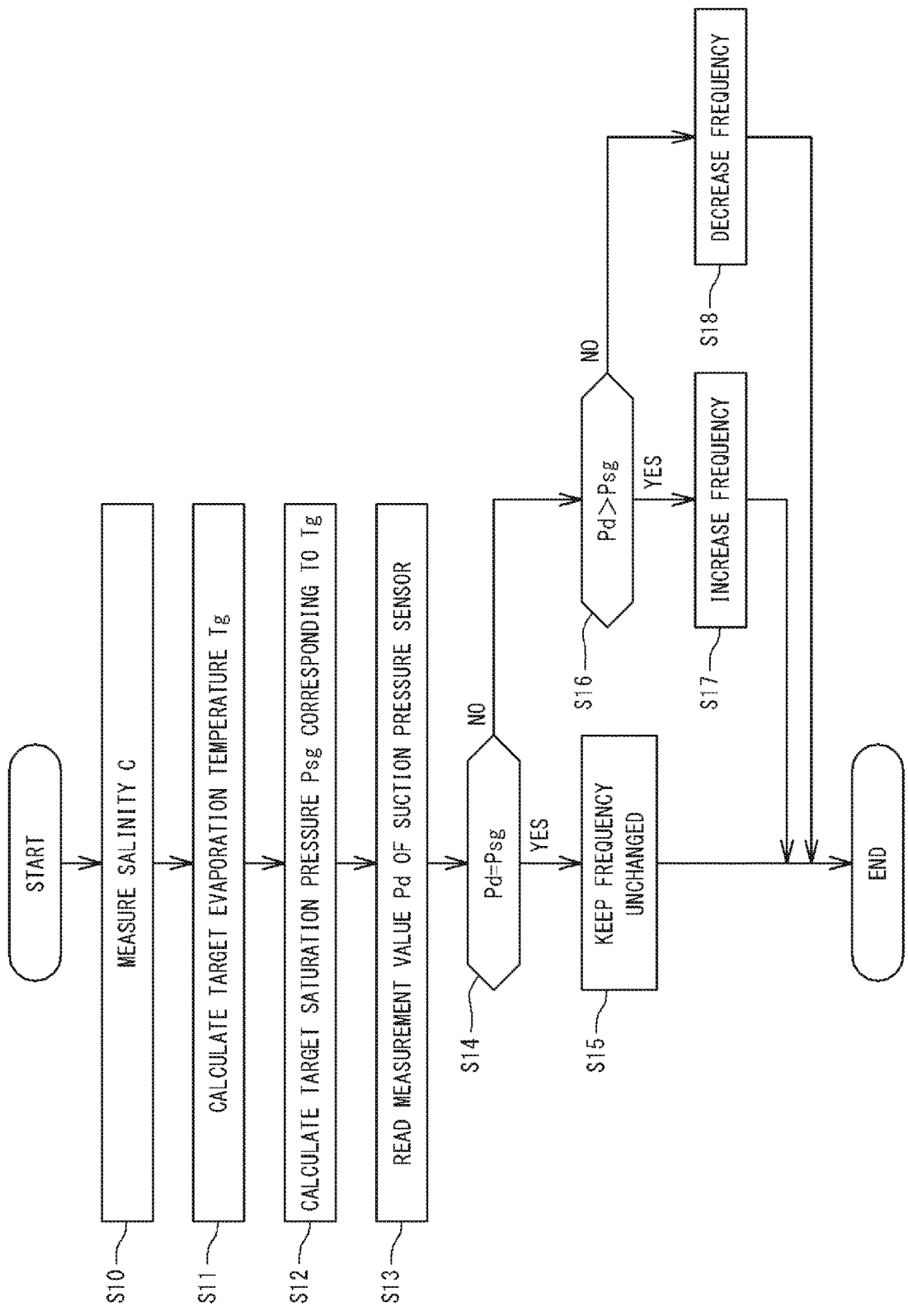
FIG. 4 is a flowchart exemplifying evaporation temperature control based on salinity.

1) Evaporation Temperature Control (FIG. 4)

This control includes adjusting refrigerant evaporation temperature at the evaporator 20 during icemaking operation. One or more embodiments include control to adjust the refrigerant evaporation temperature in accordance with a relational expression (see FIG. 3) for achievement of both stable icemaking operation and desired icemaking capacity regardless of salinity change.

The "stable icemaking operation" herein indicates operation with the blade mechanism 15 rotating stably without a phenomenon (ice lock) that an ice layer adheres to the inner surface of the inner pipe 12 due to subcooling and the blades 23 receive excessive loads.

Figure 5:
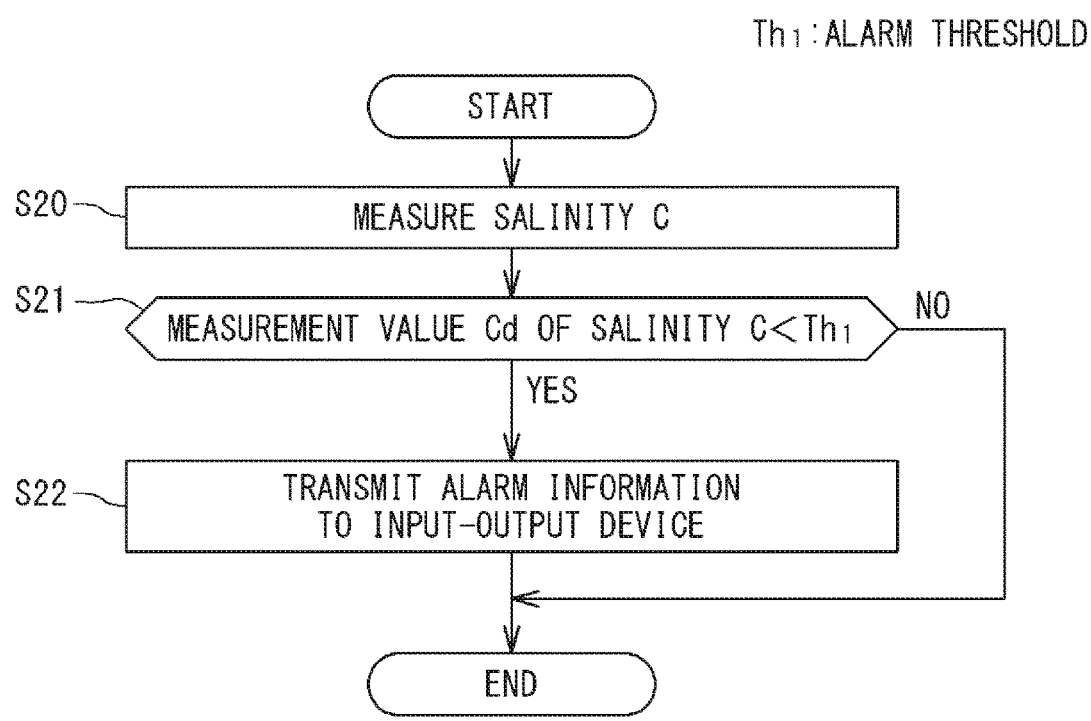
FIG. 5 is a flowchart exemplifying alarm control based on salinity.

2) Alarm Control (FIG. 5)

This control includes notifying to a user of the icemaking system 50 of predetermined warning (e.g. display of a current salinity value and a demand for additional salt supply) in accordance with seawater salinity during icemaking operation.

As to be described later, the icemaking system 50 according to one or more embodiments has icemaking capacity deteriorating as seawater has lower salinity. The icemaking system 50 is thus made to operate so as not to extremely decrease the seawater salinity, so that alarm control described above is needed.

Figure 6:
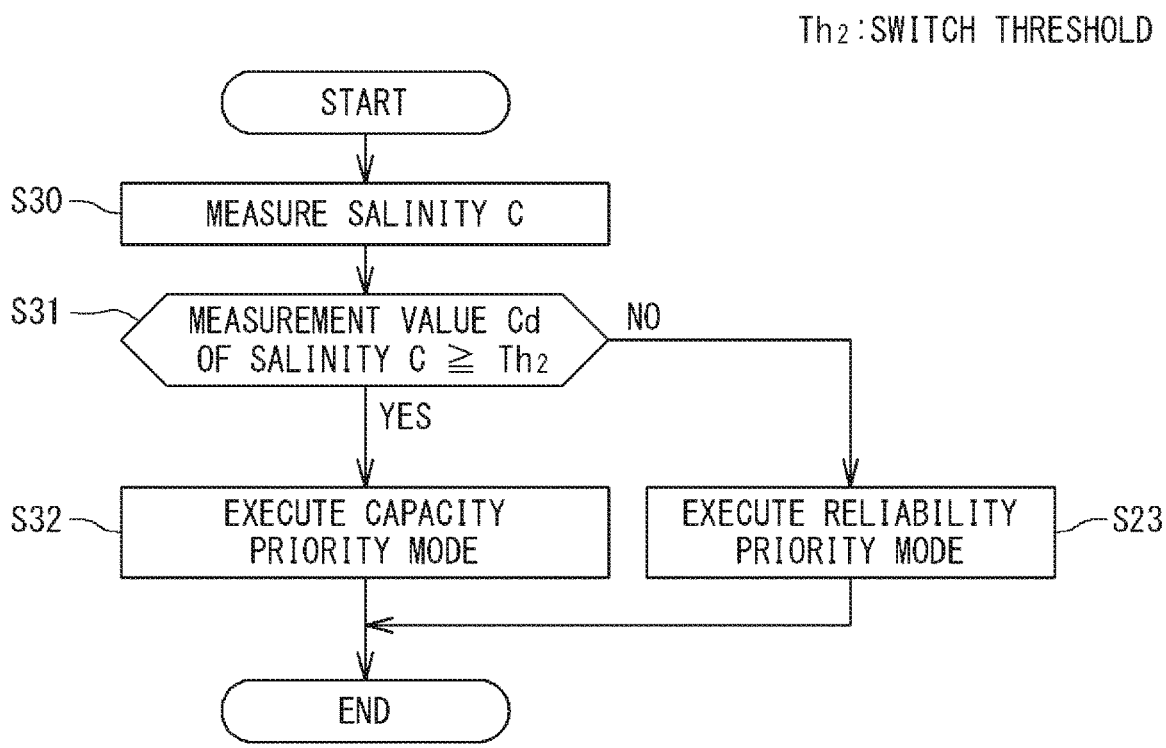
FIG. 6 is a flowchart exemplifying mode switch control based on salinity.

3) Mode Switch Control (FIG. 6)

This control includes switching a control mode during icemaking operation to either a "reliability priority mode" or a "capacity priority mode" in accordance with seawater salinity during icemaking operation.

The reliability priority mode corresponds to a control mode adopted to prioritize freezing prevention rather than icemaking capacity, and is executed if seawater salinity is less than a predetermined value. The "capacity priority mode" corresponds to a control mode adopted to prioritize icemaking capacity rather than freezing prevention, and is executed if seawater salinity is equal to or more than the predetermined value.

The three types of control described above needs following sensors 31 to 33 provided in the icemaking system 50.

A suction pressure sensor 31 is attached to a suction pipe of the compressor 2 and is configured to measure pressure of a refrigerant flowing in the suction pipe. The suction pressure sensor 31 has a measurement value substantially equal to low pressure of the refrigeration cycle executed in the refrigerant circuit 60.

A salinity sensor 32 is attached to a seawater inlet pipe of the lower ice generator 1L and is configured to measure salinity of seawater flowing in the inlet pipe. The salinity sensor 32 has a measurement value substantially equal to salinity of seawater flowing into the lower ice generator 1L.

A seawater temperature sensor 33 is attached to the seawater inlet pipe of the lower ice generator 1L and is configured to measure temperature of seawater flowing in the inlet pipe. The seawater temperature sensor 33 has a measurement value substantially equal to temperature of seawater flowing into the lower ice generator 1L.

The storage unit 82 in the control device 80 stores control information used for the control of the above types. The control information includes a plurality of types of relational expressions between salinity C and evaporation temperatures T1 and T2 ($T1 = A1 \times C$, $T2 = A2 \times C$), and first and second thresholds Th1 and Th2.

The relational expressions and the thresholds are recorded in the storage unit 82 when the user predeterminedly inputs to the input-output device 90 or a user terminal communicably connected to the input-output device 90.

The above relational expressions ($T1 = A1 \times C$, $T2 = A2 \times C$) are used to calculate the appropriate evaporation temperatures T1 and T2 of the refrigerant during evaporation temperature control (FIG. 4).

The first threshold Th1 is a threshold (hereinafter, also called an "alarm threshold") of the salinity C referred to for alarm control (FIG. 5). The second threshold Th2 is a threshold (hereinafter, also called a "switch threshold") of the salinity C referred to for mode switch control (FIG. 6).

The input-output device 90 is constituted by a user interface communicable with the control device 80. The control device 80 and the input-output device 90 may communicate wiredly or wirelessly.

The input-output device 90 may be a communication device (e.g. a remote controller, a note PC, a tablet PC, or a mobile terminal) provided separately from the control device 80, or may be an operation interface accommodated along with the control device 80 in a single case.

The input-output device 90 includes an input unit having a touch panel, various input buttons, or the like configured to receive operation input, a display unit such as a display configured to display information received from the control device 80 to the user, and a speaker configured to output the predetermined information by means of audio.

The input-output device 90 includes a communication port (e.g. a USB port or an RS-232 port) for communication with the user terminal such as the note PC. Connecting the user terminal to the input-output device 90 enables communication between the user terminal and the control device 80 in this case.

[Specific Example of Control Parameter]

Figure 3:
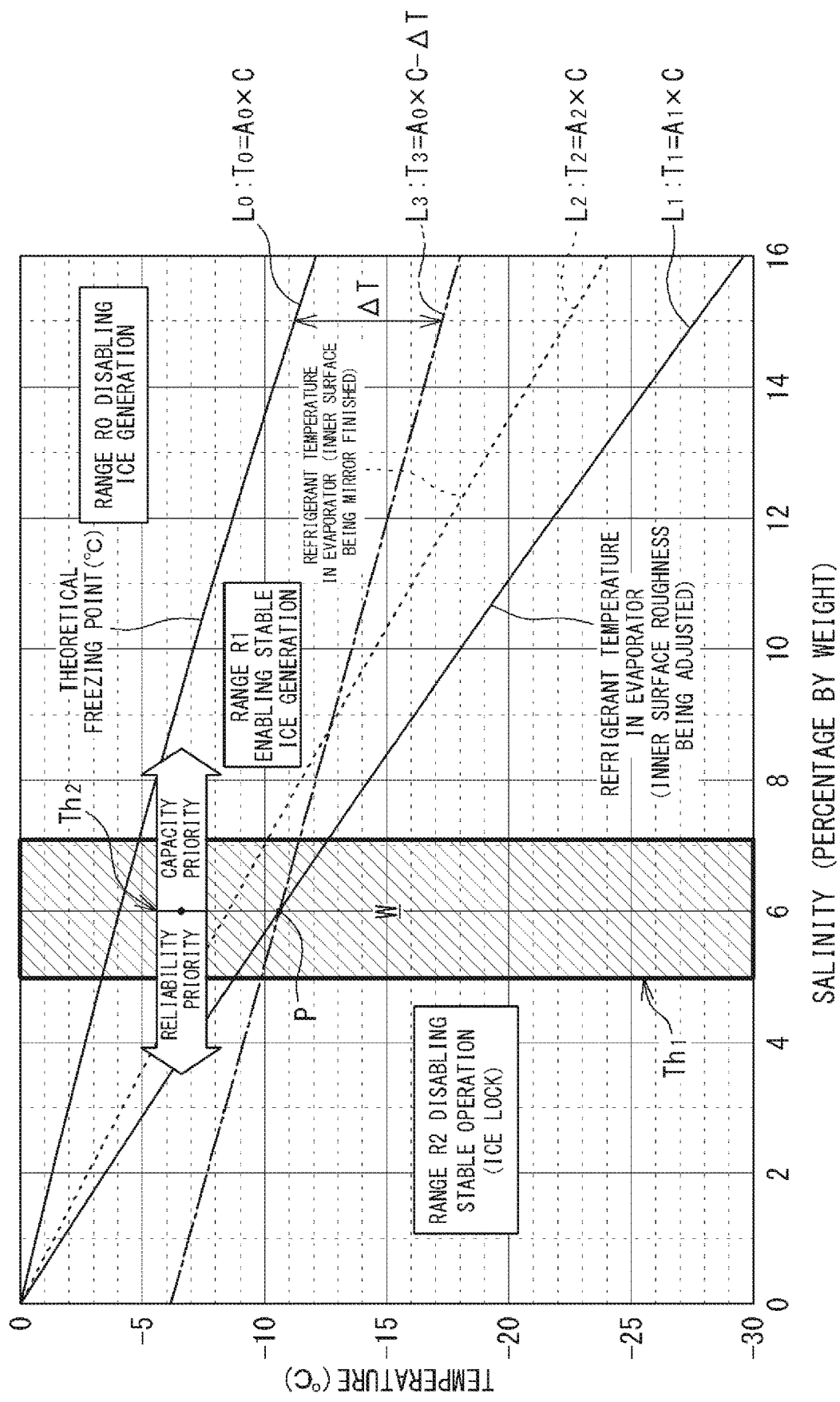
FIG. 3 is a graph indicating a relation of seawater salinity to a freezing point and evaporation temperature.

FIG. 3 is a graph indicating a relation of seawater salinity to a freezing point and evaporation temperature.

FIG. 3 has a transverse axis indicating salinity (percentage by weight), and an ordinate axis indicating temperature (° C.).

The graph in FIG. 3 includes a straight line L0 indicating a theoretical freezing point (° C.) of seawater.

Assuming that seawater has the salinity C and theoretical freezing temperature T0, these values have correlation indicated by the straight line L0 having a linear function of $T0=A0\times C$. The value A0 is a coefficient (inclination) indicating a depression degree of the freezing point of seawater relative to the salinity C.

There is a temperature range R0 that is positioned above the straight line L0 and does not allow seawater to freeze. There is a temperature range that is positioned below the straight line L0 and allows seawater to freeze.

FIG. 3 indicates a function L1 defining a boundary between a temperature range R1 allowing stable icemaking operation without ice lock and a temperature range R2 possibly causing ice lock. Assuming that seawater has the salinity C and the refrigerant has the evaporation temperature T1, the function L1 can be defined by a linear function exemplified by $T1=A1\times C$. The function L1 indicates correlation of a case of adjusting inner surface roughness of the inner pipe 12, and differs depending on whether or not seawater contains ice nucleation. The function L1 is preliminarily determined for each icemaking system 50 through test operation or a simulation test.

FIG. 3 indicates a function L2 also defining a boundary between the temperature range R1 allowing stable icemaking operation without ice lock and the temperature range R2 possibly causing ice lock. Assuming that seawater has the salinity C and the refrigerant has the evaporation temperature T2, the function L2 can be defined by a linear function exemplified by $T2=A1\times C$. The function L2 indicates correlation of a case of not adjusting inner surface roughness of the inner pipe 12 (mirror finished), and differs depending on whether or not seawater contains ice nucleation. The function L1 is preliminarily determined for each icemaking system 50 through test operation or a simulation test.

There is provided a straight line L3 indicating evaporation temperature T3 based on the idea according to Patent Literature 1 (hereinafter, called "the conventional exemplary case"). The evaporation temperature T3 of the refrigerant is obtained by subtracting a predetermined temperature difference ΔT from solution crystallization temperature (seawater freezing temperature) in the conventional exemplary case. The straight line L3 is thus expressed by a linear function of $T3=A0\times C-\Delta T$.

FIG. 3 includes a point P as an intersection point between the function L1 and the straight line L3. FIG. 3 exemplifies a case where the salinity C at the intersection point P is 6%.

As indicated in FIG. 3, the functions L1 and L2 according to one or more embodiments have straight lines passing an origin and having coefficients A1 and A2 (negative values) less than the coefficient A0 (having larger absolute values), respectively. A reason therefor will be exemplarily described below with reference to the function L1.

The straight line L3 is in parallel with the straight line L0 and is shifted downward by the predetermined temperature difference ΔT from the straight line L0. The evaporation temperature T3 of the refrigerant is thus constantly lower by the predetermined temperature difference ΔT than the freezing temperature T0 of seawater regardless of change in salinity C.

In a concentration range (C<6%) on the left of the intersection point P, the straight line L3 is positioned below the function L1. If the evaporation temperature T3 obtained in accordance with the straight line L3 in the concentration range (C<6%) is set to a target value, the icemaking amount increases excessively to possibly cause ice lock.

In another concentration range (C≥6%) on the right of the intersection point P, the straight line L3 is positioned above the function L1. If the evaporation temperature T3 obtained in accordance with the straight line L3 in the concentration range (C≥6%) is set to the target value, ice lock can be prevented but icemaking operation is executed at the unnecessarily high evaporation temperature T3.

When the evaporation temperature T3 obtained in accordance with the straight line L3 with the constant temperature difference ΔT regardless of the salinity C is set to the target value, ice lock is likely to occur in a range less than predetermined salinity, and icemaking capacity cannot be improved in a range equal to or more than the predetermined salinity.

In contrast, the function L1 is expressed by a straight line defining the boundary between the temperature range R1 and the temperature range R2, passing the origin, and having the coefficient A1 larger in absolute value than the coefficient A0. The evaporation temperature T1 obtained in accordance with the function L1 and set to the target value thus enables icemaking operation with maximum icemaking capacity while ice lock is inhibited even if the salinity C changes.

When the target value is set to the evaporation temperature T1 obtained in accordance with the relational expression of the function L1 having a temperature difference from the straight line L0 increased in accordance with increase in salinity C, icemaking operation can be stabilized and desired icemaking capacity can be exhibited with the salinity C having any value.

The coefficients A1 and A2 have a relation A1>A2 in terms of absolute values because a roughened inner surface of the inner pipe 12 in the ice generator 1 leads to a less icemaking amount at an initial freezing stage in comparison to a smooth inner surface (mirror plane). In this case, ice is less likely to adhere and ice lock is thus less likely to occur even if the evaporation temperature T1 is set to be lower than the evaporation temperature T2.

FIG. 3 includes a hatched bold frame portion indicating an ordinary concentration range W of the salinity C of seawater recommended during icemaking operation from seawater in the icemaking system 50.

As indicated in FIG. 3, the salinity C of seawater has the concentration range W generally from 5% to 7%. The alarm threshold Th1 according to one or more embodiments is set to a lower limit value (=5%) of the ordinary concentration range W of the salinity C.

The switch threshold Th2 is set to the salinity C corresponding to icemaking capacity required to the icemaking system 50 (hereinafter, referred to as "required capacity").

Specifically, the switch threshold Th2 may be set to 6% in a case where the salinity C achieving required capacity of the icemaking system 50 as desired by the user is 6%.

[Evaporation Temperature Control Based on Salinity]

FIG. 4 is a flowchart exemplifying evaporation temperature control based on the salinity C.

During icemaking operation, the control unit 81 in the control device 80 executes evaporation temperature control depicted in the flowchart of FIG. 4 on a predetermined control cycle (e.g. 20 to 60 seconds).

As depicted in FIG. 4, the control unit 81 initially measures the current salinity C of seawater (step S10).

The salinity C of seawater is, for example, a measurement value Cd of the salinity sensor 32. The measurement value Cd of the salinity C of seawater may be a salinity calculation value obtained assuming that the measurement value of the seawater temperature sensor 33 is seawater freezing temperature in the ice generator 1.

The control unit 81 subsequently calculates target evaporation temperature Tg from the measurement value Cd of the salinity C (step S11). Specifically, the control unit 81 calculates the target evaporation temperature Tg of the refrigerant in accordance with the following equation (1) or (2) in the control mode of prioritizing icemaking capacity of the icemaking system 50 (hereinafter, called the "capacity priority mode").

$$Tg=T1=A1 \times Cd \quad (1) \text{ when inner surface roughness is adjusted}$$

$$Tg=T2=A2 \times Cd \quad (2) \text{ when inner surface roughness is not adjusted}$$

Specifically, the control unit 81 regards the evaporation temperature T1 calculated in accordance with the equation (1) as the target evaporation temperature Tg of the refrigerant when the ice generator 1 in the own system includes the inner pipe 12 having adjusted inner surface roughness.

The control unit 81 regards the evaporation temperature T2 calculated in accordance with the equation (2) as the target evaporation temperature Tg of the refrigerant when the ice generator 1 in the own system includes the inner pipe 12 having unadjusted inner surface roughness (mirror finished).

In the control mode of prioritizing certainty of stable icemaking operation (reliably of the icemaking system 50) (hereinafter, called the "reliability priority mode"), the control unit 81 regards, as the target evaporation temperature Tg, temperature obtained by adding a predetermined margin a (e.g. +2° C.) to the evaporation temperature T1 or T2.

The control unit 81 subsequently calculates saturation pressure (hereinafter, called "target saturation pressure") Psg corresponding to the target evaporation temperature Tg and determined in accordance with physical properties of the refrigerant (step S12).

The control unit 81 reads a measurement value Pd of the suction pressure sensor 31 (step S13). The control unit 81 determines whether or not the measurement value Pd is equal to the target saturation pressure Psg (step S14).

If step S14 has a positive determination result (Pd=Psg), the control unit 81 keeps an inverter frequency of the compressor 2 (step S15). The compressor 2 accordingly has unchanged output.

If step S14 has a negative determination result (Pd≠Psg), the control unit 81 determines whether or not the measurement value Pd of the suction pressure sensor 31 is more than the target saturation pressure Psg (step S16).

If step S16 has a positive determination result (Pd>Psg), the control unit 81 increases the inverter frequency of the compressor 2 by a predetermined amount (step S17) to increase output of the compressor 2.

If step S16 has a negative determination result (Pd<Psg), the control unit 81 decreases the inverter frequency of the compressor 2 by a predetermined amount (step S18) to decrease output of the compressor 2.

As described above, in the icemaking system 50 according to one or more embodiments, the storage unit 82 stores the correlation equations (T1=A1×C, T2=A2×C) between the salinity C and the evaporation temperature T1, T2 of the refrigerant, which are defined such that the freezing temperature T0 of seawater and the evaporation temperature T1, T2 of the refrigerant have a temperature difference increased as the salinity C increases.

The control unit 81 calculates the target evaporation temperature Tg corresponding to the measurement value Cd of the salinity C in accordance with the above relational expressions (T1=A1×C, T2=A2×C), and adjusts output of the compressor 2 to achieve the target saturation pressure Psg corresponding to the target evaporation temperature Tg thus calculated.

Even if the salinity C changes during icemaking operation, ice lock can be inhibited and desired icemaking capacity can be secured to achieve both of stable icemaking operation and stable icemaking capacity.

The icemaking system 50 according to one or more embodiments adopts the relational expressions (T1=A1×C, T2=A2×C) having the temperature difference between the freezing temperature T0 and the evaporation temperature T1, T2 of the refrigerant being increased as the salinity C increases. The control unit 81 in the control device 80 thus calculates the target evaporation temperature Tg (i.e. the target evaporation temperature Tg leading to increase in icemaking amount) having a larger negative deviation from the freezing temperature T0 as the measurement value Cd of the salinity C increases.

The control unit 81 accordingly executes evaporation temperature control (FIG. 4) including the following first and second processing.

the first processing: calculating the target evaporation temperature Tg in accordance with the relational expressions (T1=A1×C, etc.) having a larger icemaking amount as the salinity C increases (step S10 and step S11 in FIG. 4)

the second processing: adjusting the evaporation temperature at the evaporator 20 to reach the target evaporation temperature Tg thus calculated (step S12 to S18 in FIG. 4)

In the icemaking system 50 according to one or more embodiments, the control unit 81 calculates the target evaporation temperature Tg in accordance with the relational expressions (T1=A1×C, etc.) having a larger icemaking amount as the salinity C increases (step S10 and step S11 in FIG. 4). The salinity C of seawater thus increases naturally in the circulation circuit 70 to improve icemaking capacity by simply extending duration of icemaking operation and increasing the icemaking amount.

Icemaking capacity can be improved also by additionally supplying salt into the seawater tank 8 on the circulation circuit 70 to increase the salinity C.

In the icemaking system 50 according to one or more embodiments, the storage unit 82 stores the relational expressions (T1=A1×C, T2=A2×C) differentiated for the cases of adjusting and not adjusting the inner surface roughness of the inner pipe 12.

The control unit 81 adjusts the evaporation temperature at the evaporator 20 in accordance with the relational expression (T1=A1×C) for the ice generator 1 having adjusted inner surface roughness if the ice generator 1 in the own system is applicable, and adjusts the evaporation temperature at the evaporator 20 in accordance with the relational expression (T2=A2×C) for the ice generator 1 having unadjusted inner surface roughness if the ice generator 1 in the own system is applicable.

This configuration enables setting the target evaporation temperature Tg accurately in accordance with the type of the ice generator 1 included in the icemaking system 50. The evaporation temperature at the evaporator 20 can thus be adjusted more appropriately in comparison to a case of referring to an identical relational expression regardless of whether or not inner surface roughness is adjusted.

[Alarm Control Based on Salinity]

As indicated in FIG. 3, in a concentration range of the salinity C less than the operative range W (5% to 7%), the function L1 (or the function L2) is positioned adjacent to the straight line L0 with a small temperature difference therebetween (i.e. a temperature difference allowing the refrigerant evaporation temperature to be lowered without ice lock).

In such a concentration range less than the operative range W (5% to 7%), the evaporation temperature may not be lowered sufficiently and icemaking capacity may not be improved as desired.

In view of this, the user may execute work such as supplying the seawater tank 8 with salt in order to increase the salinity C of seawater in the circulation circuit 70 to the operative range (5% to 7%) in a case where the salinity C of seawater is less than 5% immediately after the icemaking system 50 starts or the like.

The icemaking system 50 according to one or more embodiments thus executes alarm control based on the salinity C in order to notify the user of the salinity C failing to secure icemaking capacity.

FIG. 5 is a flowchart exemplifying alarm control based on the salinity C.

During icemaking operation, the control unit 81 in the control device 80 executes alarm control depicted in the flowchart of FIG. 5 on a predetermined control cycle (e.g. 20 to 60 seconds).

As depicted in FIG. 5, the control unit 81 initially measures the current salinity C of seawater (step S20).

The salinity C of seawater is, for example, a measurement value Cd of the salinity sensor 32. The measurement value Cd of the salinity C of seawater may be a salinity calculation value obtained assuming that the measurement value of the seawater temperature sensor 33 is seawater freezing temperature in the ice generator 1.

The control unit 81 subsequently determines whether or not the measurement value Cd of the salinity C is less than the predetermined alarm threshold Th1 (e.g. 5%) (step S21).

If step S21 has a positive determination result (Cd<Th1), the control unit 81 transmits predetermined alarm information to the input-output device 90.

If step S21 has a negative determination result (Cd≥Th1), the control unit 81 terminates processing without transmitting the predetermined alarm information.

The input-output device 90 having received the alarm information notifies the user of the alarm information in a recognizable mode. The alarm information includes the measurement value Cd of the current salinity C, the fact that the measurement value Cd fails to exhibit icemaking capacity, information indicating that salt needs to be added, or the like.

The alarm information is notified by means of at least one of display presentation and audio output. The input-output device 90 displays or audibly outputs alarm information indicating "current salinity is 2.5%, supply salt until salinity reaches at least 5%" or the like.

As described above, the control unit 81 in the icemaking system 50 according to one or more embodiments outputs, to the input-output device 90, alarm information to the user of the icemaking system 50 in order to warn that the measurement value Cd of the salinity C of seawater is less than the first threshold Th1 during icemaking operation.

The user can thus be notified of that the salinity C of seawater is too low to exhibit icemaking capacity and can be demanded to execute predetermined work such as supply of salt into the seawater tank 8 in the icemaking system 50.

[Mode Switch Control Based on Salinity]

FIG. 6 is a flowchart exemplifying mode switch control based on the salinity C.

During icemaking operation, the control unit 81 in the control device 80 executes evaporation temperature control depicted in the flowchart of FIG. 6 on a predetermined control cycle (e.g. 20 to 60 seconds).

As depicted in FIG. 6, the control unit 81 initially measures the current salinity C of seawater (step S30).

The salinity C of seawater is, for example, a measurement value Cd of the salinity sensor 32 or the like. The measurement value Cd of the salinity C of seawater may be a salinity calculation value obtained assuming that the measurement value of the seawater temperature sensor 33 is seawater freezing temperature in the ice generator 1.

The control unit 81 subsequently determines whether or not the measurement value Cd of the salinity C is equal to or more than the predetermined switch threshold Th1 (e.g. 6%) (step S31).

If step S31 has a positive determination result (Cd≥Th2), the control unit 81 executes the capacity priority mode as the control mode during icemaking operation.

Specifically, the control unit 81 adopts the evaporation temperature T1 (=A1×C) or the evaporation temperature T2 (=A2×C) as the target evaporation temperature Tg of evaporation temperature control described above, and adjusts output of the compressor 2 such that the icemaking system 50 exhibits maximum icemaking capacity.

If step S31 has a negative determination result (Cd<Th2), the control unit 81 executes the reliability priority mode as the control mode during icemaking operation.

Specifically, the control unit 81 adopts the evaporation temperature T1+α(=A1×C+α) or the evaporation temperature T2+α(=A2×C+α) as the target evaporation temperature Tg of evaporation temperature control described above, and operates the compressor 2 to have output achieving reliable inhibition of ice lock.

As described above, in the icemaking system 50 according to one or more embodiments, the control unit 81 executes the reliability priority mode of prioritizing freezing prevention when the measurement value Cd of the salinity C of seawater during icemaking operation is less than the second threshold Th2, and executes the capacity priority mode of prioritizing icemaking capacity when the measurement value Cd of the salinity C of seawater during icemaking operation is equal to or more than the second threshold Th2. This enables appropriate icemaking operation according to a level of the salinity C.

[First Modification Example]

The control unit 81 according to the embodiments described above adjusts the frequency of the inverter compressor 2 in order to achieve the target saturation pressure Psg corresponding to the target evaporation temperature Tg, to adjust the evaporation temperature at the evaporator 20 to the target evaporation temperature Tg (step S12 to step S18 in FIG. 4).

The evaporation temperature at the evaporator 20 may be adjusted in accordance with any one of various methods in addition to the above. Exemplified below are adoptable methods, inclusive of the already described method, of adjusting the evaporation temperature at the evaporator 20 in the icemaking system 50 according to one or more embodiments.

first adjustment: adjusting the frequency of the inverter compressor 2

The first adjustment is described in the above embodiments.

second adjustment: adjusting at least one of a full load or unload period and an unload percentage of the compressor 2 of an unload type.

The second adjustment may be adopted in a case where the compressor 2 is of the unload type. In this case, the control unit 81 adjusts at least one of the full load or unload period and the unload percentage of the compressor 2 in order to achieve the target saturation pressure Psg corresponding to the target evaporation temperature Tg, to adjust the evaporation temperature at the evaporator 20 to the target evaporation temperature Tg.

third adjustment: adjusting the opening degree of the expansion valve 5

The third adjustment may be adopted in a case where the expansion valve 5 is constituted by an electronic expansion valve having a controllable opening degree. In this case, the control unit 81 adjusts the opening degree of the expansion valve 5 in order to achieve the target saturation pressure Psg corresponding to the target evaporation temperature Tg, to adjust the evaporation temperature at the evaporator 20 to the target evaporation temperature Tg.

fourth adjustment: adjusting rotational speed of the fan 10

The fourth adjustment may be adopted in a case where the fan 10 has controllable rotational speed. In this case, the control unit 81 adjusts the rotational speed of the fan 10 in order to achieve the target saturation pressure Psg corresponding to the target evaporation temperature Tg, to adjust the evaporation temperature at the evaporator 20 to the target evaporation temperature Tg.

fifth adjustment: adjusting output of a heating member (i.e., heater) 27 configured to heat a flow-in pipe of the evaporator 20

The fifth adjustment may be adopted in a case where there is provided the heating member 27 (e.g. an electrothermal heater) configured to heat the flow-in pipe of the evaporator 20. In this case, the control unit 81 adjusts output of the heating member 27 such that a temperature sensor (not depicted) provided at the flow-in pipe of the evaporator 20 indicates the target evaporation temperature Tg, to adjust the evaporation temperature at the evaporator 20 to the target evaporation temperature Tg.

sixth adjustment: adjusting a seawater flow rate

The sixth adjustment includes adjusting output of the pump 9 for seawater to adjust the seawater flow rate of the seawater flow path 12A in the ice generator 1. In this case, the control unit 81 adjusts the seawater flow rate such that the temperature sensor (not depicted) provided at the flow-in pipe of the evaporator 20 indicates the target evaporation temperature Tg, to adjust the evaporation temperature at the evaporator 20 to the target evaporation temperature Tg.

[Second Modification Example]

The predetermined relational expressions (T1=A1×C, T2=A2×C) define correlation between the salinity C of seawater and the evaporation temperature T1, T2 of the refrigerant in the above embodiments. The relational expressions therebetween should not be limited to the linear functions but may alternatively be quadratic or cubic functions. The correlation therebetween may be defined by a reference table or defined graphically as in FIG. 3.

Specifically, the storage unit 82 may store the correlation between the salinity C and the evaporation temperature T1, T2 by means of any one of relational expressions, a table, or a graph.

[Third Modification Example]

The icemaking system 50 including the plurality of ice generators 1U and 1L as in the above embodiments may execute emergency control of protecting the ice generator 1L when the ice generator 1U has ice lock.

In an exemplary case where the icemaking system 50 includes the two ice generators 1U and 1L and an operation stop condition (e.g. rapid increase in current value of the motor 25) of the ice generator 1U is satisfied, the control unit 81 decreases output of the compressor 2 before actually stopping the blade mechanism 15.

In this case, the compressor 2 has an output decrease rate that may be defined in accordance with the number of the assemblies in the blade mechanism 15. In a case of stopping the ice generator 1U in the two ice generators 1U and 1L, output of the compressor 2 may be halved before stopping the ice generator 1U.

Such emergency control leads to prevention of rapid fall in evaporation temperature at the evaporator 20 due to unchanged output of the compressor 2, to prevent damage of the blade mechanism 15 in the remaining ice generator 1L.

[Fourth Modification Example]

Figure 7:
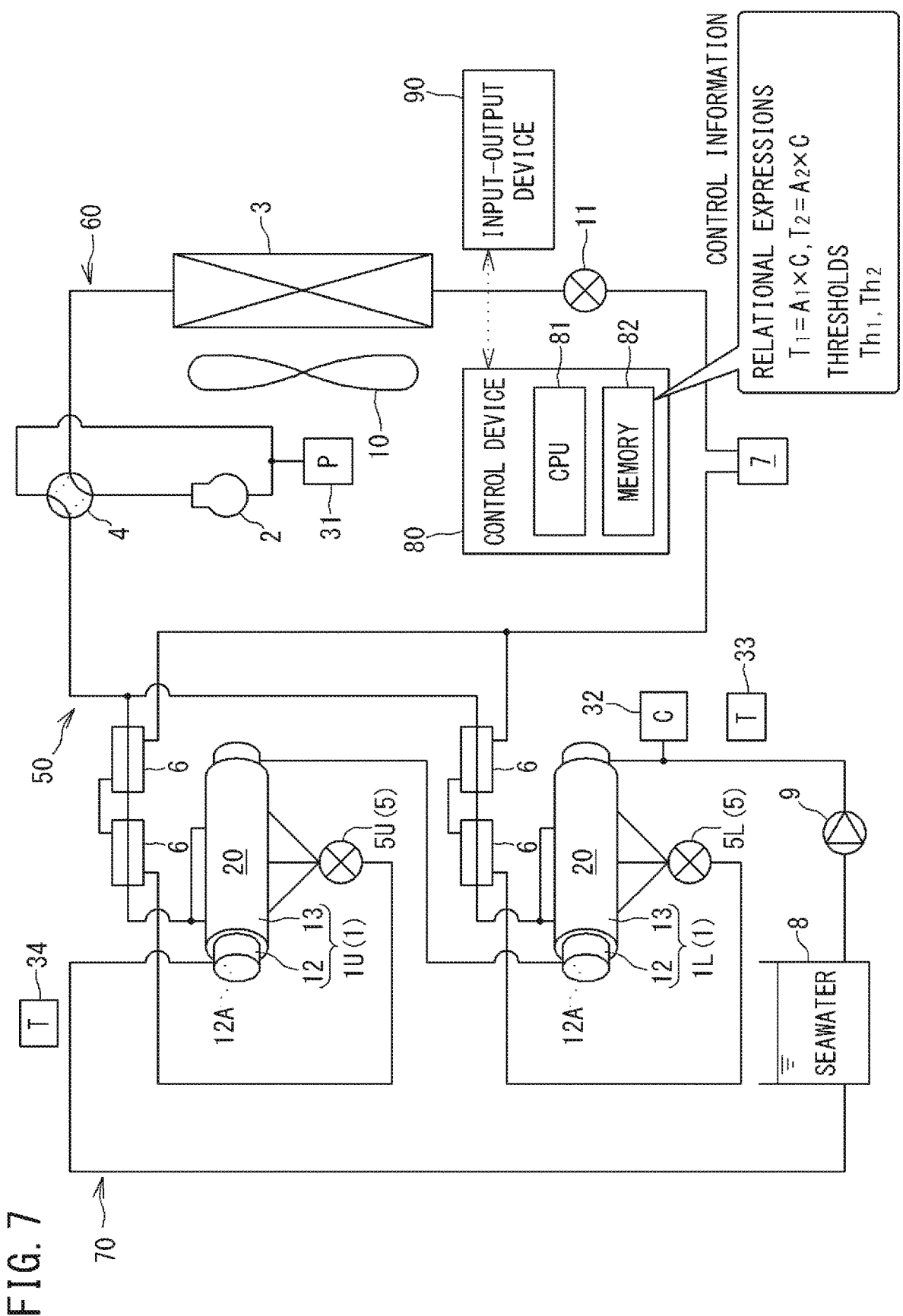
FIG. 7 is a schematic configuration diagram of an icemaking system according to a fourth modification example of one or more embodiments of the present invention.

FIG. 7 is a schematic configuration diagram of an icemaking system according to a fourth modification example of one or more embodiments of the present invention.

In the above embodiments, the measurement value Cd of the salinity sensor 32 attached to the seawater inlet pipe of the lower ice generator 1L is adopted as the salinity C of seawater. The fourth modification example exemplifies calculating the salinity C of seawater in accordance with the seawater freezing temperature. Such a calculation value can be referred to for evaporation temperature control, alarm control, and mode switch control according to the above embodiments.

As depicted in FIG. 7, the icemaking system according to the present modification example includes a seawater temperature sensor 34 provided at a seawater outlet pipe of the upper ice generator 1U. The seawater temperature sensor 34 has a measurement value substantially equal to temperature of seawater drained from the upper ice generator 1U.

Figure 8:
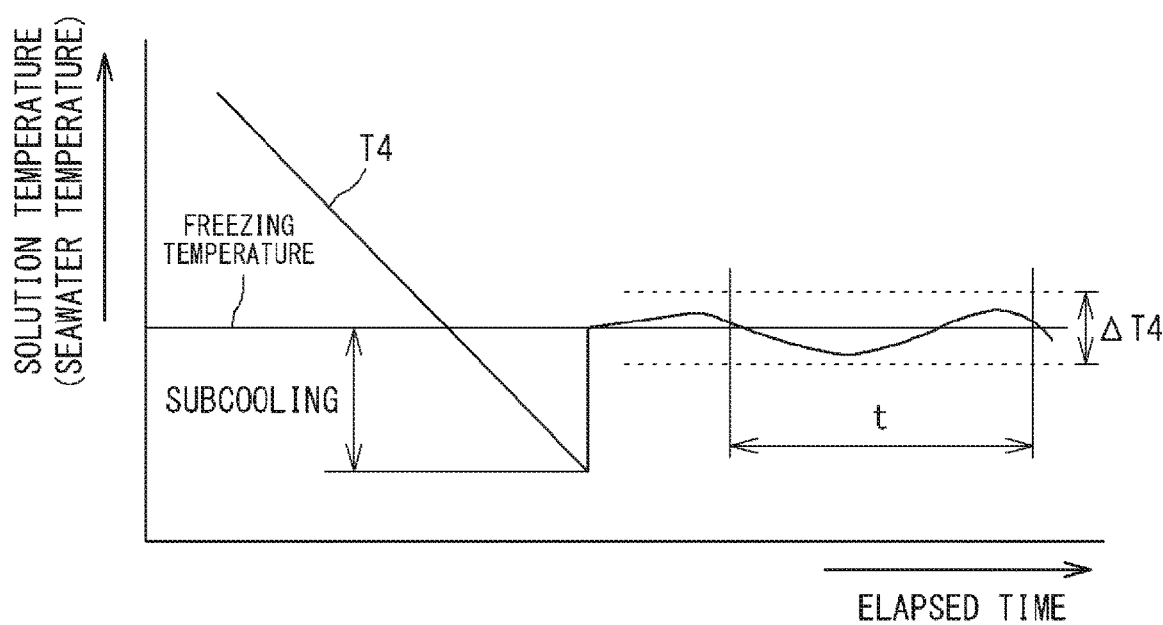
FIG. 8 is a graph indicating chronological change in seawater temperature at an outlet of the ice generator.

FIG. 8 is a graph indicating chronological change in seawater temperature at the outlet pipe of the upper ice generator. As indicated in FIG. 8, the outlet pipe of the ice generator 1U has seawater temperature T4 that is gradually lowered after the icemaking system starts operation and is further lowered after the seawater temperature T4 reaches the freezing temperature, so that the outlet pipe comes into a subcooling state. The seawater temperature T4 rises to reach the freezing temperature to start ice generation if the subcooling state is cancelled.

As indicated in FIG. 3, the seawater freezing temperature T0 and seawater concentration C have a proportional relation as indicated by the linear function L0. If the seawater freezing temperature T0 can be detected, the seawater concentration C can be calculated in accordance with the freezing temperature T0. In view of this, the present modification example includes detecting a state where seawater has the freezing temperature in accordance with temperature change as indicated in FIG. 8, and obtaining the seawater concentration C in accordance with the freezing temperature.

Figure 9:
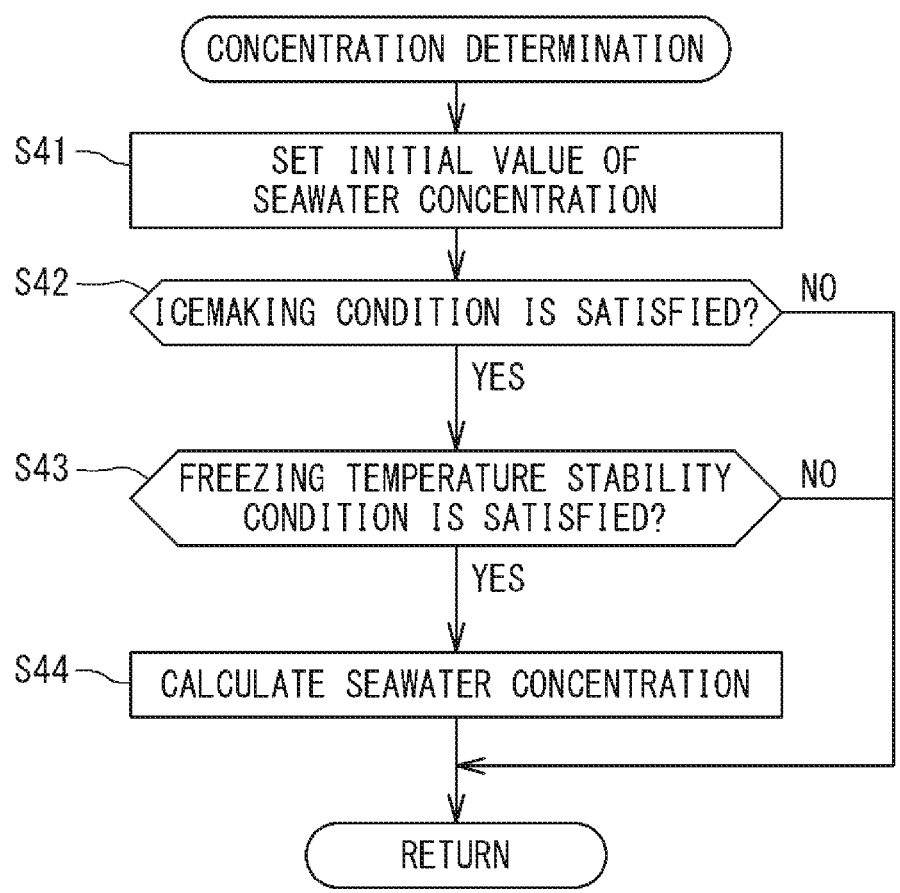
FIG. 9 is a flowchart exemplifying seawater salinity calculation according to the fourth modification example.

FIG. 9 is a flowchart exemplifying seawater salinity calculation according to the fourth modification example.

As depicted in FIG. 9, the control unit 81 in the control device 80 initially sets an initial value C0 of the salinity C of seawater (step S41). The initial value C0 may be set to C0=3.5% or the like. In this case, the initial value C0 is less than concentration in the ordinary concentration range W. The target evaporation temperature of the refrigerant is thus set to a rather high level in order to prevent ice lock.

The control unit 81 subsequently determines whether or not seawater temperature detected by the seawater temperature sensor 34 satisfies a predetermined icemaking condition (step S42). For example, the control unit 81 determines whether or not the measurement value T4 of the seawater temperature sensor 34 satisfies T4<1° C. The control unit 81 further determines whether or not the freezing temperature satisfies a predetermined stability condition (step S43). As indicated in FIG. 8, seawater no more in the subcooling state has temperature rise to reach the freezing temperature, and icemaking then starts. If icemaking is executed normally, the seawater temperature is kept at the freezing temperature without significant change. Step S43 includes determining whether or not the seawater temperature is stably kept at the freezing temperature, and setting the measurement value T4 of the seawater temperature sensor 34 to the freezing temperature only in a case where the seawater temperature is stably kept at the freezing temperature.

Such determination in step S43 is made in accordance with whether or not one or more are satisfied among the following three conditions.

(condition 1) a difference between a maximum value and a minimum value of the measurement value T4 of the seawater temperature sensor 34 during predetermined time (e.g. one minute) falls within a predetermined temperature range ΔT4 (e.g. within 0.5° C.).

(condition 2) the maximum value and the minimum value of the measurement value T4 of the seawater temperature sensor 34 during predetermined time (e.g. one minute) fall within a predetermined range (e.g. within ±0.25° C.) centered on an average of measurement values during the predetermined time.

(condition 3) a state where at least one of the condition 1 and the condition 2 is satisfied for predetermined time t (e.g. five minutes).

When the freezing temperature T0 is set, the control unit 81 calculates the seawater concentration C in accordance with the function L0 indicated in FIG. 3 (step S44). The control unit 81 then executes evaporation temperature control, alarm control, and mode switch control described above in accordance with the seawater concentration C thus calculated.

If the duration time t, which is referred to for determination of whether or not the measurement value of the seawater temperature sensor 34 is stable in step S43, is set to a too large value, change in salinity of seawater due to icemaking may appear as change in freezing temperature. It is thus difficult to obtain stable freezing temperature in this case. The duration time t may be set such that the stability condition for the freezing temperature is satisfied before seawater concentration changes by 1%.

[Other Modification Examples]

The embodiments disclosed herein should be exemplary in terms of every aspect and should not be restrictive. The present invention includes any modification recited by claims within meanings and a scope equivalent to those recited in the claims.

The above embodiments exemplify the ice generator 1 configured as the "horizontal" double pipe icemaker 1. The ice generator 1 may alternatively be configured as a "vertical" or "gradient" double pipe icemaker.

The above embodiments exemplify the icemaking system 50 including the two ice generators 1. The icemaking system 50 may alternatively include only one ice generator or at least three ice generators.

The above embodiments exemplify the icemaking system 50 adopting "seawater" as the cooling target of the refrigerant circuit 60. The cooling target of the refrigerant circuit 60 should not be limited to seawater, but can be generalized to "solution" inclusive of seawater.

When the cooling target is generalized to solution, "seawater" in the above embodiments may be replaced with "solution". Furthermore, "salinity" of seawater in the above embodiments may be replaced with "solute concentration" of solution.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: DOUBLE PIPE ICEMAKER (ICE GENERATOR)
1U: UPPER DOUBLE PIPE ICEMAKER (ICE GENERATOR)
1L: LOWER DOUBLE PIPE ICEMAKER (ICE GENERATOR)
2: COMPRESSOR 3: HEAT SOURCE HEAT EXCHANGER (CONDENSER)
4: FOUR-WAY SWITCHING VALVE
5: FIRST EXPANSION VALVE
5U: UPPER FIRST EXPANSION VALVE
5L: LOWER FIRST EXPANSION VALVE
7: RECEIVER
8: SEAWATER TANK (SOLUTION TANK)
9: PUMP
10: FAN
11: SECOND EXPANSION VALVE
12A: SEAWATER FLOW PATH (SOLUTION FLOW PATH)
12: INNER PIPE
13: OUTER PIPE
13A: REFRIGERANT FLOW PATH
15: BLADE MECHANISM
16: FLOW-IN PORT (FOR SEAWATER)
17: FLOW-OUT PORT (FOR SEAWATER)

18: FLOW-IN PORT (FOR REFRIGERANT)
19: FLOW-OUT PORT (FOR REFRIGERANT)
20: HEAT EXCHANGE UNIT (EVAPORATOR)
20A: FLOODED EVAPORATOR
21: SHAFT
22: SUPPORT BAR
23: BLADE
24: SEALING WALL
25: MOTOR
31: SUCTION PRESSURE SENSOR
32: SALINITY SENSOR (SOLUTE CONCENTRATION SENSOR: MEASUREMENT UNIT)
33: SEAWATER TEMPERATURE SENSOR (SOLUTION TEMPERATURE SENSOR: MEASUREMENT UNIT)
50: ICEMAKING SYSTEM
60: REFRIGERANT CIRCUIT
70: CIRCULATION CIRCUIT
80: CONTROL DEVICE
81: CONTROL UNIT
82: STORAGE UNIT
90: INPUT-OUTPUT DEVICE
Th1: ALARM THRESHOLD (FIRST THRESHOLD)
Th2: SWITCH THRESHOLD (SECOND THRESHOLD)

The invention claimed is:

1. An icemaking system comprising:
   a refrigerant circuit that executes a vapor compression refrigeration cycle;
   a circulation circuit that circulates solution as a cooling target of the refrigerant circuit; and
   a control device that controls refrigerant evaporation temperature at the refrigerant circuit, wherein
   the circulation circuit comprises a solution flow path of:
      an ice generator;
      a solution tank that stores the solution; and
      a pump that pressure feeds the solution to the solution flow path,
   the refrigerant circuit comprises:
      an evaporator of the ice generator;
      a compressor;
      a condenser; and
      an expansion valve, and
   the control device comprises a central processing unit that:
      calculates target evaporation temperature based on a correlation between solute concentration of the solution and the refrigerant evaporation temperature, wherein the correlation is defined such that a temperature difference between freezing temperature of the solution and evaporation temperature at the evaporator increases as the solute concentration increases, and
      adjusts the evaporation temperature at the evaporator to decrease as the solute concentration of the solution increases and to reach the target evaporation temperature thus calculated.

2. The icemaking system according to claim 1, wherein the ice generator is configured by a double pipe icemaker comprising an inner pipe and an outer pipe,
   the correlation includes:
      a first correlation for when the inner pipe has adjusted inner surface roughness; and
      a second correlation for when the inner pipe has unadjusted inner surface roughness.

3. The icemaking system according to claim 2, wherein the central processing unit:
   adjusts the evaporation temperature at the evaporator based on the first correlation when the ice generator has adjusted inner surface roughness; and
   adjusts the evaporation temperature at the evaporator based on the second correlation when the ice generator has unadjusted inner surface roughness.

4. The icemaking system according to claim 1, wherein the central processing unit outputs alarm information for warning a user that the solute concentration has a measurement value less than a first threshold.

5. The icemaking system according to claim 1, wherein the central processing unit:
   executes a reliability priority mode of prioritizing freezing prevention rather than icemaking capacity when a measurement value of the solute concentration is less than a second threshold; and
   executes a capacity priority mode of prioritizing icemaking capacity rather than freezing prevention when the measurement value of the solute concentration is equal to or more than the second threshold.

6. The icemaking system according to claim 1, wherein the evaporation temperature at the evaporator is adjusted by:
   adjusting a frequency of the compressor of an inverter type,
   adjusting at least one of a full load or unload period and an unload percentage of the compressor of an unload type,
   adjusting an opening degree of the expansion valve,
   adjusting rotational speed of a fan,
   adjusting output of a heater that heats a flow-in pipe of the evaporator, and
   adjusting a flow rate of the solution.

7. A method of controlling evaporation temperature at an evaporator of an ice generator, where the evaporator in a refrigerant circuit executes a vapor compression refrigeration cycle having solution as a cooling target, the method comprising:
   calculating target evaporation temperature based on a correlation between solute concentration and a refrigerant evaporation temperature, wherein the correlation is defined such that as the solution has higher concentration, an icemaking amount increases and a temperature difference between freezing temperature of the solution and the evaporation temperature at the evaporator increases; and
   adjusting the evaporation temperature at the evaporator to reach the target evaporation temperature thus calculated.

* * * * *

UNITED STATES PATENT AND TRADEMARK OFFICE
CERTIFICATE OF CORRECTION

| | |
|---|---|
| PATENT NO. | : 11,614,264 B2 |
| APPLICATION NO. | : 16/959621 |
| DATED | : March 28, 2023 |
| INVENTOR(S) | : Azuma Kondou et al. |

It is certified that error appears in the above-identified patent and that said Letters Patent is hereby corrected as shown below:

In the Claims

At Column 20, Claim number 7, Line number 50, "such that as the solution" should read -- such that, as the solution --.

Signed and Sealed this
Sixth Day of June, 2023

Katherine Kelly Vidal
*Director of the United States Patent and Trademark Office*